United States Patent [19]

Ogasawara et al.

[11] Patent Number: 5,019,440

[45] Date of Patent: May 28, 1991

[54] DECORATIVE PLATE

[75] Inventors: Yasukichi Ogasawara; Kazuo Ishige; Keizo Ogata, all of Tokyo, Japan

[73] Assignee: Toyo Ink Manufacturing Co., Ltd., Tokyo, Japan

[21] Appl. No.: 417,077

[22] Filed: Oct. 4, 1989

Related U.S. Application Data

[63] Continuation-in-part of Ser. No. 269,715, Nov. 10, 1988, abandoned.

[30] Foreign Application Priority Data

Nov. 18, 1987 [JP]  Japan .......................... 62-176150[U]
May 26, 1989 [JP]  Japan ............................ 1-61034[U]

[51] Int. Cl.⁵ ............................................. B32B 9/00
[52] U.S. Cl. ..................................... 428/195; 428/150;
428/426; 428/423.1; 428/908.8; 428/913.3
[58] Field of Search ............ 428/150, 195, 426, 423.1,
428/908.8, 913.3

[56] References Cited

U.S. PATENT DOCUMENTS 4,410,562  10/1983  Nemoto et al. ..................... 430/271
4,517,235  5/1985  Ungar et al. ........................ 428/150
4,520,062  5/1985  Ungar et al. ........................ 428/150

FOREIGN PATENT DOCUMENTS 58-151350  9/1983  Japan .
63-166737  7/1988  Japan .

OTHER PUBLICATIONS

Pat. Abs. 3838930, Ogaigwara et al., 06/01/89.
Pat Abs. 63166737, 070988, Asa. Glass.

Primary Examiner—Patrick J. Ryan
Attorney, Agent, or Firm—Wenderoth, Lind & Ponack

[57] ABSTRACT

A decorative glass or plastic plate comprising a primer layer of a light-permeable polyurethane resin, a transfer-printed layer of a printed image formed of an ink containing a pigment and a binder, and a cured resin layer, these layers being formed consecutively on one surface of a light-permeable glass plate.

19 Claims, 1 Drawing Sheet

DECORATIVE PLATE

This application is a continuation-in-part of now abandoned application Ser. No. 07/269,715 filed Nov. 10, 1988 now abandoned.

FIELD OF THE INVENTION

This invention relates to a decorative glass plate and decorative plastic plate usable as a paneling board such as interior wall, ceiling, exterior wall, etc., or for interior decoration.

PRIOR ART OF THE INVENTION

As examples of a decorative glass plate or decorative plastic plate, it is possible to cite a decorative plate manufactured by forming a printed silk screen directly on transparent glass plate or plastic plate (to be sometimes referred to as a light-permeable plate), or a laminated glass or plastic plate formed by placing a printed layer between glass pates or plastic plates.

Japanese Laid-Open Patent Publication No. 65584/1975 describes an intermediate film for a laminated glass, which is formed by providing a transfer-printed layer between two polyvinyl butyral resin films. When a decorative glass plate is manufactured by using this intermediate film, it is necessary to place the intermediate film between two glass plates and carry out thermal press-bonding of the two glass plates. Thus, there is a problem that the use of two glass plates increases the manufacturing cost. And a paneling board cannot be produced by using one glass plate and the above intermediate film, since the thermally bonded film exposes one surface of its own.

Japanese Laid-Open Utility Model Publication No. 38028/1984 describes a paneling board manufactured by forming a pattern layer on one surface of a transparent acryl plate by means of transfer and bonding a transparent glass plate onto the other surface of the transparent acryl plate, i.e. opposite to the pattern layer. In this case, bubbles tend to be contained in a binder solution, and a skilled bonding operation is necessary to obtain bubble-free paneling boards having high commercial value.

Japanese Laid-Open Utility Model Publication No. 156839/1981 describes a decorative glass plate obtained by carrying out steps of forming a photosensitive resin layer on one surface of a transparent plate and forming a printed layer on said photosensitive layer, repeating steps of forming a photosensitive resin layer and then a printed layer to effect a multicolor printing, laminating a glass plate thereon, and then subjecting the laminate to UV irradiation to cure the photosensitive layers. This decorative glass plate uses a photosensitive resin as a bonding layer and packing layer. Since, however, most glass plates are impermeable to UV ray except special glass plates, there is difficulty in carrying out the curing of the photosensitive layers.

Japanese Laid-Open Patent Publication No. 94460/1983 describes a pattern layer-formed article manufactured by providing a transparent or semitransparent resin layer to one surface of a mold, placing a transfer sheet on said resin layer while said resin layer is uncured or semi-cured, curing said resin layer, then separating the transfer sheet to complete the transfer of the pattern, then laminating an intermediate layer on the pattern side of the resin layer, and forming a substrate layer on the intermediate layer. In this case, since the transfer is carried out while the resin layer is uncured or semicured, the surface nature of the resin layer is very sticky. For this reason, there is a problem that contamination with air is likely to occur, thus making it difficult to carry out a uniform transfer of a pattern.

Further, there is known a decorative glass plate which is made by laminating a transparent film having a print on one surface thereof on a glass plate by means of a binder. However, this decoractive glass plate is not sufficient as a paneling board for semi-permanent use. That is because it has a problem that two components thereof tend to separate from each other in the bonded portion depending upon ambient temperature and humidity.

Japanese Laid-Open Patent Publication No. 166737/1988 dislcoses a transfer-printed decorative glass plate manufactured by forming a resin coating film of a transparent layer of a resin dyeable with a sublimable dye and an opaque layer on the surface of a glass substrate, and mounting a transfer paper, on which patterns are formed of an ink containing the sublimable dye, on the resin coating film to transfer the patterns to the resin coating film. In this decorative glass pate, the sublimable dye has to shift to the transparent layer through the opaque layer, and the use of the sublimable dye is essential. Thus, this decorative glass plate has a problem that it is inferior in resistance to light.

SUMMARY OF THE INVENTION

It is an object of this invention to provide a fine enduring decorative plate manufactured by accurately transferring fine printing images which are pre-formed on a transfer sheet by method of gravure printing, etc.

It is another object of this invention to provide a decorative plate which can be manufactured by using one light-permeable plate.

It is still another object of this invention to provide a decorative plate which can be manufactured at low costs.

It is yet another object of this invention to provide a decorative plate which can be manufactured by uniformly transferring a printing image formed on a transfer sheet without air bubbles at the time of the transfer.

It is further another object of this invention to provide a decorative plate which can be manufactured without using any special glass or special plastic plate such as a UV ray-permeable one, and the like.

This invention provides a decorative glass plate manufactured by consecutively forming a primer layer of light-permeable polyurethane resin, a transfer-printed layer having a transferred image formed of an ink containing a pigment and and a binder, and a cured resin layer on one surface of a light-permeable glass plate.

Further, this invention provides a decorative plastic plate manufactured by consecutively forming a primer layer of light-permeable polyurethane resin, a transfer-printed layer having a transferred image formed of an ink containing a pigment and a binder, and a cured resin layer on one surface of a light-permeable plastic plate.

DETAILED DESCRIPTION OF THE INVENTION

Figure 1:
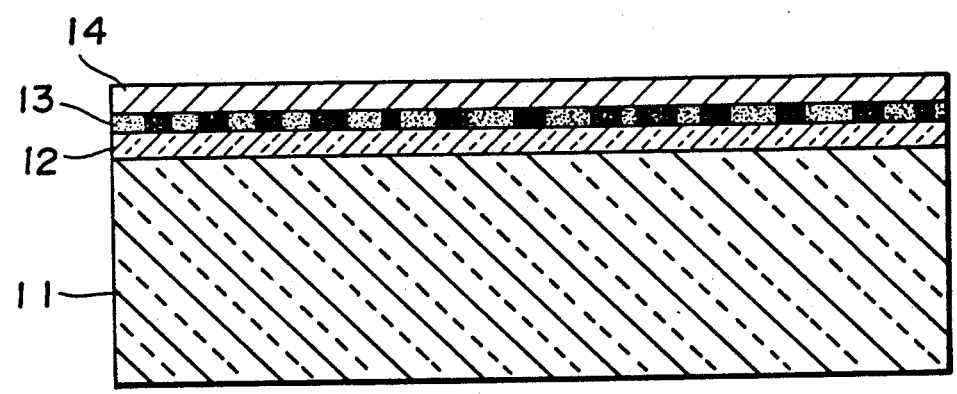
FIG. 1 shows a cross sectional view of the decorative glass plate of this invention.

The constitution of the decorative plate (decorative glass plate or decorative plastic plate) of this invention will be explained on the basis of the use of a light-permeable glass plate and by referring to the drawings, in which a primer layer 12, a transfer-printed layer 13 and a cured resin layer 14 are formed on one surface of a light-permeable plate 11.

In this invention, the plate has to be one through which the transfer-printed layer can be viewed. There is no limitation on the thickness of the light-permeable plate. Practically, however, plates having a thickness of 1 to 10 mm are preferably used. The light-permeable plate has only to be permeable to visible light, and it does not have to be any special one such as a UV ray-permeable glass, or the like. preferred examples of the plastic plate include polymethyl methacrylate, polycarbonate, polyethylene terephthalate, nylon, epoxy, polymethyl pentene, etc. When the light-permeable plate is a glass plate, it is desirable to subject the glass plate 11 to surface treatment with silane coupling agent before formation of the primer layer in view of good intimate contact of the primer layer to the surface of the glass plate 11. When a plastic plate is used as a light-permeable plate, it is possible to obtain good intimate contact of the primer layer to the surface of the plastic plate without any special surface treatment as above. However, the plastic plate surface may be treated with corona discharge, etc., as required.

Examples of the silane coupling agent usable in this invention include γ-glycidoxypropyltrimethoxysilane, β-(3,4-epoxycyclohexyl)ethyltrimethoxysilane, N-(dimethoxymethylsilylpropyl)ethylenediamine, N-(triethoxysilylpropyl)ethylenediamine, γ-amino-propyltriethoxysilane, vinyltriethoxysilane, vinyl tris(β-methoxyethoxy)silane, etc.

In this invention, the primer layer is a coating resin layer formed on the surface of the light-permeable plate and having a thickness of 1 to 100 μm, and it works such that the transfer-printed layer can be firmly attached to the plate. This invention uses, as a primer layer, a room temperature-curing polyurethane resin coating composition obtained from polyisocyanate and polyol. It is difficult to use thermosetting resin in this invention due to the use of a glass plate. When a glass plate is used as a light-permeable plate, a room temperature-curing resin is used. If the resin is cured at a high temperature, there is a risk that cracking will occur in the glass. Especially preferably usable is a non-yellowing polyurethane coating composition composed of aliphatic polyisocyanate or alicyclic polyisocyanate such as hexamethylenediisocyanate as polyisocyanate, since such a coating composition does not undergo any yellowing change in exposure to light for a long period of time. Further, for the use of the decorative plate as an exterior wall, and the like, preferably usable is a polyurethane resin composed of a fluorine resin-based polyol having excellent durability.

Examples of the polyisocyanate usable in this invention are aliphatic polyisocyanate such as trimethylene diisocyanate, tetramethylene diisocyanate, pentamethylene diisocyanate, 1,2-propylene diisocyanate, 1,2-butylene diisocyanate, 2,4,4-trimethylhexamethylene diisocyanate, 2,2,4-trimethylhexamethylene diisocyanate, 2,6-diisocyanatomethyl caproate, and alicyclic polyisocyanate such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, methyl-2,4-cyclohexane diisocyanate, methyl-2,6-cyclohexane diisocyanate, and the like.

Examples of the polyol useful in this invention include compounds having about 2 to 6 functional groups, preferably about 2 to 4 functional groups, and a molecular weight of 200 to 10,000, preferably about 300 to 5,000. More particularly, there may be mentioned polyester polyols, polyols, acrylic polyols, polyurethane polyols or mixtures thereof.

Examples of such polyester polyols include polyester polyols obtained by reacting dibasic acids, such as terephthalic acid, isophthalic acid, adipic acid and sebacic acid, their dialkyl ester or a mixture thereof with glycol, such as ethylene glycol, propylene glycol, diethylene glycol, butylene glycol or neopentyl glycol, or a mixture thereof.

Examples of the polyether polyols include polyether polyols obtained by polymerizing oxirane compounds such as ethylene oxide, propylene oxide, butylene oxide and tetrahydrofuran with the use of water or low molecular weight polyol, such as ethylene glycol, propylene glycol, trimethylolpropane or glycerol, as initiator.

Examples of the acrylic polyols include those obtained by copolymerizing monomers having not less than one hydroxyl group in the molecule, such as hydroxyethyl acrylate, hydroxypropyl acrylate, hydroxypropyl acrylate, hydroxybutyl acrylate, etc., or their corresponding methacrylic acid derivatives, with acrylic acid, methacrylic acid or their esters.

The polyurethane polyols are polyols having urethane linkage in the molecule and are for example obtained by reacting polyether polyols, polyester polyols or polyether ester polyols having a molecular weight of about 200 to 5,000 with the above-mentioned organic polyisocyanates in the NCO/OH ratio of less than about 1, preferably not more than about 0.8.

Furthermore, the primer layer also has to be permeable to light, since the transfer-printed layer has to be viewed therethrough. For this reason, clear coating compositions are used as such.

In this invention, the transfer-printed layer is formed by transferring a printing image of any pattern to the surface of the primer layer. For the transfer-printed layer 13, there is used a transfer sheet obtained by preprinting an image on a substrate such as polyester film, etc., by gravure printing method. For example, the transfer-printed layer can be formed by bringing the printed surface of the transfer sheet into thermal contact with the surface of the primer layer under pressure. An ink containing, as a binder, at least one selected from a vinyl chloride-vinyl acetate copolymer, polyvinyl chloride, polyvinylidenechloride, polyvinylacetete, acrylic resin, rubber chloride and cyclized rubber is usable for the above printing on the transfer sheet. An ink containing, as a binder, a vinyl chloride-vinyl acetate coplymer is especially preferably usable. The reason therefor is that since this copolymer resin has a coefficient of thermal expansion nearly identical with that of urethane resin, neither cracking nor shrinking occurs in the transfer-printed layer when the resultant glass plate is cooled after the transfer.

An ink in which 1 to 300 parts by weight of a pigment is dispersed in 100 parts by weight of the binder is preferably usable. And, for example, when a printing image is formed on a transfer sheet by a gravure printing method, the above ink is adjusted such that its nonvolatile content in a solvent is 50 to 15% by weight. The transfer-printed layer is formed by pressing a printing image of the above ink under heat at a temperature of 150° to 80° C., and in this case, the thickness of the layer of the ink is preferably 1 to 5 μm.

In this invention, the cured resin layer is formed in order to reinforce the transfer-printed layer and improve durability of the decorative plate. Particularly, it is desirable that the cured resin layer is formed of a covering ability-possessing coating composition containing a pigment such as titanium white, carbon black, and the like, to make a transfer-printed image clearer. The cured resin layer may contain up to 60% by weight of a pigment. The same polyurethane resin as that used in the primer layer may be used for the cured resin layer. Further, other resins, e.g. unsaturated polyester resin, are also usable if those resins are curable at room temperature or low temperature. The thickness of the cured resin layer is not limited. However, the cured resin layer has a thickness of, preferably, not less than 5 μm in view of improvement in durability of the decorative glass plate.

When the light-permeable plate is a plastic plate, it is preferable to form a hard coat layer on the other surface of the plastic plate which is opposite to its surface on which the transfer-printed layers, etc., are formed. The hard coat layer is a coating film having excellent resistance to marring which tends to occur on the surface of the plastic plate. The hard coat layer is formed of a clear coating composition, since the transfer-printed layer has to be viewed through the light-permeable plate. The coating composition to form the hard coat layer may be that which can form a coating film having excellent resistance to marring, and no other special limitation is imposed thereon. Examples of the coating composition above include organoalkoxysilane using a heat-curable silicone-based resin, photo-setting, e.g. UV ray-setting epoxy, urethane or polyester-based acrylic coating compositions, and the like. Preferably usable are room temperature-curing or photo-setting coating compositions.

Unlike a laminate of glass pates or plastic plates, the decorative plate of this invention is manufactured by forming layers of curable resins on a glass plate or plastic plate. Therefore, its manufacuring cost is low and its weight is also small. In the decorative glass plate of this invention, a fine printing image can be accurately transferred. Therefore, it looks fine and has high decorative value.

Further, in the decorative plate of this invention, since the decorative pattern can be formed by a gravure printing method, etc., its decorative value is high. Furthermore, since the transfer-printed layer is set between the curable resin layers having excellent durability, the decorative plate of this invention is excellent in durability and therefore has high utility as a paneling board for interior and exterior walls requiring semipermanent use.

EXAMPLES

The following examples will illustrate this invention more specifically. In the Examples, "%" stands for "weight percent".

EXAMPLE 1

A surface-treating liquid was prepared according to the following formulation.

| | |
|---|---|
| Silane coupling agent (KBM-603 made by Shin-etsu Chemical Industries, Ltd.) | 0.1% |
| Isopropyl alcohol | 99.9% |

A glass plate having a thickness of 10 mm was immersed in a 5% sodium hydroxide aqueous solution at 40° C. for 1 minute and taken out. Then, ion-exchanged water was sprayed onto the glass plate for 30 seconds to wash away alkali liquid remaining on the surface thereof, and the glass plate was then dried in heated air at 80° C. for 3 minutes. Thereafter, the above surface-treating liquid was sprayed uniformly onto the glass plate by using a spray gun, and the glass plate was dried in heated air at 80° C. for 1 minute.

Then, a urethane resin clear coating composition for a primer layer was prepared according to the following formulation.

| | |
|---|---|
| Main Component: | |
| Acrylic polyol (Hitaloid 3008 made by Hitachi Chemical Ind., Ltd.) | 67.0% |
| Stannous octoate (made by Nippon Chemical Ind., Ltd.) | 0.1% |
| Methyl ethyl ketone | 20.0% |
| Toluene | 12.9% |
| Curing Agent: | |
| Hexamethylenediisocyanate (Sumidur N-75 made by Sumitomo-Bayer Urethane, Ltd.) | 100.0% |

The above main component and curing agent were mixed in a weight ratio of 6:1. Then, the mixture was sprayed onto the glass plate, of which the surface had been treated with the surface-treating liquid, by using a spray gun, and the glass plate was dried in heated air at 80° C. for 20 minutes. The thickness of the dried coating was adjusted to 10 microns. Thereafter, a transfer film prepared by printing a pattern on a polyester film with an ink containing a vinyl chloride-vinyl acetate copolymer as a binder was brought into contacted with the glass plate under pressure after the coating on the glass plate was heated to 100° C. The glass plate was then cooled to and the polyester film was peeled off to complete the transfer of the pattern onto the urethane coating. Then, a urethane resin white coating was prepared according to the following formualtion.

| | |
|---|---|
| Main Component: | |
| Acrylic polyol (Hitaloid 3008 made by Hitachi Chemical Ind., Ltd.) | 50.0% |
| Titanium white pigment (Tipaque R-820 made by Ishihara Sangyo K.K.) | 20.0% |
| Stannous octoate (made by Nippon Chemical Ind., Ltd.) | 0.1% |
| Methyl ethyl ketone | 10.0% |
| Toluene | 9.9% |
| Curing Agent: | |
| Hexamethylenediisocyanate (Sumidur N-75 made by Sumitomo-Bayer Urethane, Ltd.) | 100.0% |

The above main component and curing agent were mixed in a weight ratio of 8:1, and the mixture was uniformly sprayed onto the glass plate, on which the transfer treatement had been completed, by using a spray gun. Then, the glass plate was dried in heated air at 80° C. for 30 minutes. The thickness of the dried coating was adjusted to 10 microns. The resultant bonding of the pattern-printed coating film to the glass was firm, and a cross cut adhesion test using a cellophane adhesive tape showed 100/100.

EXAMPLE 2

A surface-treating liquid was prepared according to the follwoing formulation.

| | |
|---|---|
| Silane coupling agent (KBM-603 made by Shin-etsu Chemical Industries, Ltd.) | 0.1% |
| Isopropyl alcohol | 99.9% |

A glass plate having a thickness of 10 mm was immersed in a 5% sodium hydroxide aqueous solution at 40° C. for 1 minute, and taken out. Then, ion-exchanged water was sprayed onto the glass plate for 30 seconds to wash away alkali liquid remaining on its surface, and the glass plate was dried in heated air at 80° C. for 3 minutes. Thereafter, the surfaces of the glass plate were wiped with a gauze which had been dipped in the above surface-treating liquid, to apply the surface-treating liquid, and the glass plate was dried at 80° C. for 1 minute.

Then, the same urethane resin clear coating composition for a primer layer as that used in Example 1 was sprayed uniformly onto the glass plate treated with the surface-treating liquid, by using a spray gun, and the glass plate was dried in heated air at 20 minutes. The thickness of the dried coating was adjusted to 10 microns. Thereafter, a transfer film prepared by printing a pattern on a polyester film with an ink containing a vinyl chloride-vinyl acetate copolymer as a binder was brought into contact with the glass plate under pressure after the coating on the glass plate was heated to 100° C. The glass plate was then cooled to 50° C., and the polyester film was peeled off to complete the transfer of the pattern onto the urethane coating.

Then, a urethane resin black coating composition was prepared according to the following formulation.

| | |
|---|---|
| Main Component: | |
| Acrylic polyol (Hitaloid 3008 made by Hitachi Chemical Ind., Ltd.) | 50.0% |
| Carbon black pigment (Carbon black MA-100 made by Mitsubishi Chemical Ind., Ltd.) | 2.0% |
| Stannous octoate (made by Nippon Chemical Ind., Ltd.) | 0.1% |
| Methyl ethyl ketone | 25.0% |
| Toluene | 22.9% |
| Curing Agent: | |
| The same diioscyanate as that used in Example 1. | |

The same diioscyanate as that used in Example 1.

The above main component and curing agent were mixed in a weight ratio of 8:1. The mixture was uniformly sprayed, by using a spray gun, onto the glass plate on which the transfer was completed. The glass plate was dried in heated air at 80° C. for 30 minutes. The thickness of the coating was adjusted to 10 microns. The resultant bonding of the pattern-printed coating to the glass was firm, and a cross cut adhesion test using a cellophane adhesive tape showed 100/100.

EXAMPLE 3

A UV curable urethane-based acrylic coating composition was prepared according to the following formulation.

| | |
|---|---|
| Urethane acrylate (Olester RA-1353, made by Mitsui Toatsu Chemicals, Inc.) | 30.0% |
| 2,2'-Dimethoxy-2-phenyldiacetophenone | 0.5% |

| -continued | |
|---|---|
| Ethyl acetate | 30.0% |
| Toluene | 15.0% |
| Isopropyl alcohol | 15.0% |
| Cellosolve acetate | 9.5% |

The coating composition was uniformly sprayed onto one surface of a polycarbonate plate having at thickness of 5 mm by using a spray gun, the solvent was dried off with heated air in an oven, and the coating was irradiated with UV ray for 3 seconds by using a high-pressure mercury lamp (80 W/cm) to cure the coating. The cured coating was excellent in resistance to marring, and it was not marred at all even when it was rubbed with a steel wool #0000.

Then, a urethane resin clear coating composition for a primer layer was prepared according to the following formulation.

| | |
|---|---|
| Main Component: | |
| Acrylic polyol (Hitaloid 3008, made by Hitachi Chemical Ind., Ltd.) | 67.0% |
| Stannous octonate (made by Nippon Chemical Ind., Ltd.) | 0.1% |
| Methyl ethyl ketone | 20.0% |
| Toluene | 12.9% |
| Curing Agent: | |
| Hexamethylenediisocyanate (Sumidur N-75, made by Sumitomo-Bayer Urethane, Ltd.) | 100.0% |

The above main component and curing agent were mixed in a weight ratio of 6:1, the mixture was uniformly sprayed, by using a spray gun, onto the other surface of the polycarbonate plate opposite to the surface which had been subjected to the above hard coat treatment, and the coating was dried in heated air at 80° C. The thickness of the dried coating was adjusted to 10 microns. Thereafter, a transfer film prepared by printing a pattern on a polyester film with an ink containing a vinyl chloride-vinyl acetate copolymer as a binder was brought into contact with the polycarbonate plate under pressure after the coating on the polycarbonate plate was heated to 100° C. The polycarbonate plate was then cooled to 50° C., and the polyester film was peeled off to complete the transfer of the pattern onto the urethane coating. Then, a urethane resin white coating composition having the following formulation for a cured resin layer was prepared.

| | |
|---|---|
| Main Component: | |
| Acrylic polyol (Hitaloid 3008, made by Hitachi Chemical Ind., Ltd.) | 50.0% |
| Titanium white pigment (Tipaque R-820 made by Ishihara Sangyo K.K.) | 20.0% |
| Stannous octonate (made by Nippon Chemical Ind., Ltd.) | 0.1% |
| Methyl ethyl ketone | 10.0% |
| Toluene | 9.9% |
| Curing Agent: | |
| Hexamethylenediisocyanate (Sumidur N-75, made by Sumitomo-Bayer Urethane, Ltd.) | 100.0% |

The above main component and curing agent were mixed in a weight ratio of 6:1, the mixture was uniformly sprayed, by using a spray gun, onto the polycarbonate plate opposite to the surface on which the above transfer treatment was completed, and the coating was dried in heated air at 80° C. The thickness of the coating was adjusted to 10 microns.

The above bonding of the coating to the polycarbonate was firm, and a cross cut adhesion test using a cellophane adhesive tape showed 100/100.

EXAMPLE 4

The same urethane resin clear coating composition as that described in Example 1 was uniformly sprayed, by using a spray gun, onto a surface of a polycarbonate plate having a thickness of 5 mm, opposite to the surface of the polycarbonate plate which had been subjected to a hard coat treatment, and the resultant coating was dried in heated air at 80° C. The thickness of the coating was adjusted to 10 microns. Thereafter, a transfer film prepared by printing a pattern on a polyester film with an ink containing a vinyl chloride-vinyl acetate copolymer as a binder was brought into contact with the polycarbonate plate under pressure after the coating on the polycarbonate plate was heated to 100° C. The polycarbonate plate was then cooled to 50° C., and the polyester film was peeled off to complete the transfer of the pattern onto the urethane coating.

Then, a urethane resin black coating composition was prepared according to the following formulation.

| Main Component: | |
|---|---|
| Acrylic polyol (Hitaloid 3008 made by Hitachi Chemical Ind., Ltd.) | 50.0% |
| Carbon black pigment (Carbon black MA-100 made by Mitsubishi Chemical Ind., Ltd.) | 2.0% |
| Stannous octoate (made by Nippon Chemical Ind., Ltd.) | 0.1% |
| Methyl ethyl ketone | 25.0% |
| Toluene | 22.9% |
| Curing Agent: | |
| The same diiosocyanate as that used in Example 1 | |

The above main component and curing agent were mixed in a weight ratio of 8:1. The mixture was uniformly sprayed, by using a spray gun, onto the glass plate on which the transfer was completed. The polycarbonate plate was dried in heated air at 80° C. for 30 minutes. The thickness of the coating was adjusted to 10 microns. The resultant bonding of the pattern-printed coating to the plastic was firm, and a cross cut adhesion test using a cellophane adhesive tape showed 100/100.

What is claimed is:

1. A decorative glass plate comprising a primer layer of light-permeable polyurethane resin which is a room temperature-curing resin and has a thickness of 100 μm, a transfer-printing layer of a printed image formed of an ink containing a pigment and a binder, and a cured resin layer, these layers being formed consecutively on one surface of a light-permeable glass plate.

2. A decorative glass plate according to claim 1 wherein the polyurethane resin is a nonyellowing polyurethane resin.

3. A decorative glass plate according to claim 2 wherein the polyurethane resin comprises a polyisocyanate which is an aliphatic polyisocyanate or alicyclic polyisocyanate.

4. A decorative glass plate according to claim 1 wherein the transfer-printed layer is formed by bringing a printed surface of a transfer sheet on which a printing image is formed into thermal contact with the primer layer under pressure.

5. A decorative glass plate according to claim 4 wherein the printing image formed on the transfer sheet is formed of an ink containing a vinyl chloride-vinyl acetate copolymer.

6. A decorative glass plate according to claim 1 wherein the cured resin layer comprises a room temperature-curing resin.

7. A decorative glass plate according to claim 6 wherein the cured resin layer contains up to 60% by weight of a pigment.

8. A decorative glass plate according to claim 4 wherein the transfer sheet has an image formed by a gravure printing method.

9. A decorative plastic plate comprising a primer layer of a light-permeable polyurethane resin which has a thickness of 1 to 100 μm, a transfer-printed layer of a printed image formed of an ink containing a pigment and a binder, and a cured resin layer, these layers being formed consecutively one one surface of a light-permeable plastic plate.

10. A decorative plastic plate according to claim 9 wherein the light-permeable plastic plate is formed of at least one plastic selected from a group consisting of polymethyl methacrylate, polycarbonate, polyethylene terephthalate, nylon, epoxy and polymethyl pentene.

11. A decorative plastic plate according to claim 9 wherein the polyurethane resin is a nonyellowing polyurethane resin.

12. A decorative plastic plate according to claim 9 wherein the polyurethane resin comprises a polyisocyanate which is an aliphatic polyisocyanate or alicyclic polyisocyanate.

13. A decorative plastic plate according to claim 9 wherein the transfer-printed layer is formed by bringing a printed surface of a transfer sheet on which a printing image is formed into thermal contact with the primer layer under pressure.

14. A decorative plastic plate according to claim 13 wherein the printing image formed on the transfer sheet is formed of an ink containing a vinyl chloride-vinyl acetate copolymer.

15. A decorative plastic plate according to claim 9 wherein the cured resin layer comprises a room temperature-curing resin.

16. A decorative plastic plate according to claim 15 wherein the cured resin layer contains up to 60% by weight of a pigment.

17. A decorative plastic plate according to claim 9 wherein the transfer sheet has an image formed by a gravure printing method.

18. A decorative plastic plate according to claim 9 wherein the light-permeable plastic plate has a hard coat layer formed on one surface thereof, opposite to the surface of the plate on which the transfer-printed layer is formed.

19. A decorative plastic plate according to claim 18 wherein the hard coat layer is formed of a coating composition containing a thermosetting resin or a photo-setting resin.

* * * * *